3,085,953
DIMERIZATION OF DICHLOROETHYLENE
Albert J. Blardinelli and William H. Yanko, Dayton, Ohio, assignors to Monsanto Chemical Company, St. Louis, Mo., a corporation of Delaware
No Drawing. Filed Nov. 21, 1960, Ser. No. 70,438
8 Claims. (Cl. 204—154)

This invention is directed to the dimerization of dichloroethylene under the influence of ionizing radiation.

The dimerization of olefins, particularly dichloroethylene, presents a special problem, as conditions must be found such that dimerization of the olefins is brought about, but polymerization to higher molecules does not occur to a substantial amount. In the past, dichloroethylene has been dimerized by heating, usually in the presence of a peroxide catalyst and by the use of fairly high temperatures and pressures. Such procedures often give poor yields and mixtures of products. Moreover, while such procedures are fairly suitable as batch reactions, they are not readily adaptable to continuous production because of the usual long reaction times, non-uniform performance of the catalyst over a reaction period, and the problems involved in periodically adding or regenerating catalysts.

It has now been found that the dimerization of dichloroethylene will take place under the influence of ionizing radiation, e.g., gamma-rays. The dimerization is very effectively promoted by the ionizing radiations, the reaction having a radiation yield as high as 600 to 700, and the dimer being produced with very little side product. The radiation yield, or G value, is the number of molecules reacted per 100 electron volts of absorbed radiation energy. The use of ionizing radiations has certain great advantages over catalytic methods in that the amount of the ionizing radiation can be controlled as desired, and sufficient radiation can be used to react a desirde number of moles in a given reaction time. This control of the reaction time not only permits efficient use of reactor equipment and makes continuous production more practical, but it also permits selection of optimum reaction times to avoid thermal degradation or other causes for side reactions.

Dichloroethylene has been found to be suited for dimerization under the influence of ionizing radiations. Ionizing radiations have been found to have a much smaller or practically no dimerizing effect on some similar unsaturated materials. In some cases it is not economically feasible to use ionizing radiation for reactions having very low radiation yields or G values, as the cost of the ionizing radiation for a specific reaction is directly proportional to the G value; of course, this advantage of using ionizing radiation will depend upon the economics of the chemical system involved. It is desirable to have the G value as high as possible; for example, when the G value is over 100, the cost of the radiation will be relatively low. The G value for the dimerization of dichloroethylene is in the range of 600 or 700 or higher, depending upon the reaction conditions. Another advantage of high G values is the fact that in reactions having high G values, these products are predominate in the total product.

Commercial grades of cis-dichloroethylene normally have quantities of hydrochloric acid admixed therewith. Although these materials may be used as such in the process of this invention, we have found, in the course of our experiments, that if the cis-dichloroethylene is first treated with a basic material such as sodium carbonate, sodium hydroxide, calcium hydroxide, pyridine, etc., to wash out or neutralize the hydrochloric acid present in the starting material that improved results in the form of products having higher G values are obtained. Thus, as is illustrated by Examples 1 and 2 below, irradiation of two samples of cis-dichloroethylene, one not washed with base, and the other washed with base, resulted in a dimer product having a higher G value in the sample washed with base. This is surprising in view of the fact that it was previously considered advantageous by those in the art to add hydrochloric acid to the material to be dimerized or polymerized by irradiation since it was felt that the hydrochloric acid functioned to sensitize the starting materials, making it conducive to polymerization.

The reaction conditions for the dimerization, i.e., temperatures, pressures, reaction times, etc., can vary considerably. Ordinarily reaction temperatures of about 50 to 120° C. will be used, although higher or lower temperatures, e.g., from 25 to 200° C. are also effective. One of the advantages of the use of ionizing radiations is that low temperatures of the order of 50 to 90° C. can be used with practical reaction times. The dimerization is preferably conducted at atmospheric pressure, although it can be conducted at higher or lower pressures, such as under vacuum, autogenous pressure, or the pressure of inert gases. Dimerization at atmospheric pressure gives good radiation yields, and is advantageous from the standpoint of cost of reactor equipment, particularly for continuous production, so ordinarily there is no reason to use higher or lower pressures. The reaction time must be sufficient for absorption of the required amount of radiation and will vary considerably depending upon the power of the radiation source.

For example, to produce 1 mole of dimer per hour in a dimerization reaction having a radiation yield of 100 requires a power input of 53.56 watt-hours, or 26.78 watt-hours for each mole of reactant. When the G value for the reaction is in the range of 600 to 700 as is the case with the dimerization of dichloroethylene, it is necessary to have an energy absorption of about 8.93 to 7.65 watt-hours for each mole of dimer formed, or 4.47 to 3.83 watt-hours for each mole of dichloroethylene dimerized. While a definite amount of energy is required to dimerize a stated amount of dichloroethylene under specified conditions, it will be recognized that the required amount of energy can vary somewhat with the type of radiation and dimerization conditions; moreover, a greater or lesser amount of energy than the required amount can be supplied to the dichloroethylene reactant, depending upon whether complete or partial conversion of the dichloroethylene reactant is desired. However, it will usually be desirable to supply sufficient ionizing radiation to cause absorption in the range of 2 to 50 watt-hours for each mole of dichloroethylene present in the reaction mixture, and preferably about 1 to 20 watt-hours for each mole. It will usually be advantageous to use a radiation source of sufficient intensity to supply the desired radiation in a time of the order of one hour or less.

The ionizing radiation used in the present invention is preferably either high energy electrons or electro-magnetic radiation of high frequency not deflected by electric or magnetic fields and of great penetrative value, e.g., capable of penetrating 1 millimeter of aluminum sheet, e.g., gamma-rays or X-rays. The presently preferred forms of radiation are high energy electrons and gamma-radiation. Radioactive materials, e.g., cobalt-60 are suitable sources of gamma-radiation. Cobalt-60 has a half-life of 5.3 years and emits gamma-radiation of 1.33 and 1.17 mev. (million electron volts). Another example of a suitable and convenient source of gamma-radiation for carrying out the present invention is tantalum-182, having a half-life of 117 days, and gammas of 1.22, 1.13, 0.22 and 0.15 mev. Cesium-137 is another good source which can be used. Numerous other gamma emitting radioisotopes available from chain reacting piles and cyclotrons can also be used. Other materials providing gamma-radiation are available as naturally occurring materials, e.g., potassium-40, bismuth-214, protactinum-234, thallium-208, and lead-211. Choice of a particular source of gamma-radiation will depend upon availability, expense, intensity and the convenience of handling. Sources having an intensity from below 50 millicuries up to, for example, 10 kilocuries, can be conveniently handled with proper facilities. However, in order to react a substantial amount of material in a reasonably short reaction time, a source of at least about 50 curies should be used, and it is desirable to employ a source of 1 to 2 kilocuries or more. It is possible, of course, to use several sources situated at different positions in a reaction system. Green fuel elements from an atomic pile make a convenient source of gamma-radiation; green fuel elements are made up of fissionable material charged to the atomic pile, e.g., uranium-235, having associated therewith various fission products which are highly radioactive; such green fuel elements are normally stored for some time, e.g., one to six months, before chemical processing is attempted. The radiation energy being emitted during such a time is normally wasted, and can be used to advantage in the present invention. The dimerizations of the present invention can, if desired, be effected in an atomic pile, the location in the pile being selected to give the desired type and intensity of radiation.

Another suitable type of radiation for use in accordance with this invention is X-rays. X-rays are particularly adapted to reactions conducted at atmospheric pressure, as a metallic target could be placed in the reaction mixture and bombarded with electrons, thereby causing the X-rays to be emitted from a source within the reaction mixture. Another very suitable procedure is radiation with $\beta$-particles or other high energy electrons, such as electrons of around 0.05 to 15 mev. energy. Such electrons can be supplied by a Van de Graaff generator, linear accelerator, or other type generator.

While we consider that the employment of radiation with $\alpha$-particles, mesons and neutrons is within the purview of our invention, these radiations are presently considered to be less preferred than gamma- or X-ray radiation or radiation with high energy electrons. The selection of a suitable radiation system is within the skill of the art. It is only necessary to have sufficient radiation energy absorbed to convert a given number of moles in a stated reaction time, and the required energy can be readily calculated from the G value for the reaction. In continuous systems it may be advantageous to permit only about 50% of the required energy to be absorbed per cycle, and to separate the dimer product and recycle the dichloroethylene reactant.

The high energy ionizing radiations used in the present invention are of a different character than ultraviolet light which has been used in the past to induce certain chemical reactions. The majority of ultraviolet light photons from a mercury ultraviolet lamp have an energy value of 4.89 e.v., while the particles or rays of radiation applied in the present invention have energy values much greater than 5 e.v., being at least greater than 10 e.v., and usually of the order of a 0.25 million electron volts to 2.5 million electron volts or more.

Our dimerization reaction can be conducted in the presence of a solvent, e.g., an organic solvent such as a halogenated hydrocarbon, or in the absence of solvent. When a solvent is used it is preferred that the dimerization be conducted in carbon tetrachloride as an organic solvent. Other solvents which can be used are tetrachlorethane, chloroform, etc., and hydrocarbon solvents such as n-hexane, cyclohexane, n-octane, etc.

The following examples illustrate certain specific embodiments of the present invention:

*Example 1*

To a glass reactor 1936 g. (19.96 moles) of cis-dichloroethylene was charged. A 50 curie source of cobalt-60 was raised into a well in the center of the reactor, and the dichloroethylene was refluxed for 91 hours at 60–63° C. The total radiation was $2.16 \times 10^6$ roentgens. The reaction mixture, 1891 g., was distilled to give 219.3 g. of dichloroethylene dimer, mostly at B.P. 88–90° C./20 mm., $n_D^{25}$ 1.5129, and 41.9 g. of dichloroethylene trimer, B.P. 97° C./0.1 mm. to 107° C./0.28 mm. The G value for the dichloroethylene dimer was 634.

The G value, based on dichloroethylene dimerized was calculated by dividing the molecules of dichloroethylene dimerized by the total radiation (in 100 e.v. units):

$$G(\text{DCE dimer}) = \frac{6.023 \times 10^{23} \times \frac{219.3 - 1.0}{96.95}}{2.16 \times 10^6 \times 5.24 \times 10^{11} \times 1891} = 634$$

The radiation dosage resulting from use of the 50 curie Co-60 source in the above reactor was determined by a standard dosimeter test which measured the amount of ferrous ion oxidized to ferric ion under controlled oxidizing conditions in a given volume of solution in the reactor under the influence of the Co-60 source for a specified time.

*Example 2*

The procedure of Example 1 was repeated, except that for this example the cis-dichloroethylene starting material was neutralized with sodium carbonate before distillation to remove any HCl that might have been present in the cis-dichloroethylene starting material.

Thus, to a glass reactor 1936 g. of neutralized and distilled cis-dichloroethylene was added. A 50 curie source of cobalt-60 was raised into a well in the bottom of the reactor, and the cis-dichloroethylene was refluxed at 60–62° C. for 71 hours. The total radiation dose was $1.714 \times 10^6$ roentgens. There was obtained 190.3 g. of dichloroethylene dimer for a G value of 700, and 43.7 g. of dichloroethylene trimer for a G value of 161.

*Example 3*

There was added 1200 ml. of cis-dichloroethylene (⅘ size of the irradiated runs) to a reaction flask and then this was refluxed for 86 hours at 60–65° C. Upon distillation, there was obtained only 0.8 g. of dimer, trimer, etc., which for purposes of calculating G values due to irradiation is considered as 1.0 g.

The fact that heat alone in Example 3 caused only a negligible amount of dimerization, while under the same conditions but with ionizing radiation there is substantial dimerization, shows that the ionizing radiation is causing the dimerization.

The glass reactor used in these examples for the reactions at reflux was 4 inches in diameter and had a volume of about 2500 cc., and was fitted with a ⁵⁄₁₆ inch inside diameter well, which passed through the center of the bottom closure and extended into the middle of the reaction space. The purpose of the well was to permit the cobalt-60 to be surrounded by materials being subjected to gamma-radiation. The cobalt-60 strength was 50-curies. The cobalt-60 was in the form of a ¼ inch wire, 5 inches long and encased in a capsule which could be run in or out of the reactor well by remote control.

While no catalyst (other than the ionizing radiation) is required in the process of the present invention, catalysts, e.g., peroxide catalysts such as benzoyl peroxide, can be used, and the presence of such catalysts may be advantageous under some circumstances. Similarly, short-stopping agents or antioxidants, e.g., pyridine, can be present in the reaction mixture, although their presence is not necessary.

As dichloroethylene dimer is a valuable organic intermediate and solvent, an efficient and controlled method of producing this dimer has great utility.

A method of dimerizing dichloroethylene under the influence of ionizing radiation has been described.

This application is a continuation-in-part of applicants' co-pending application S.N. 599,911, filed July 25, 1956, now Patent Number 2,961,388.

We claim:

1. A process of dimerizing dichloroethylene which comprises treating dichloroethylene with a basic material to wash out hydrochloric acid present, and then subjecting the washed dichloroethylene to the influence of high energy ionizing radiation having energies of at least 10 electron volts for a time sufficient to effect the desired dimerization.

2. A process according to claim 1 in which the ionizing radiation is gamma-radiation.

3. A process according to claim 1 wherein the dichloroethylene is irradiated with high energy electrons.

4. A process of dimerizing dichloroethylene which comprises treating dichloroethylene with a basic material to wash out hydrochloric acid present and then heating the washed dichloroethylene to 50° C. to 200° C. in the presence of an applied ionizing radiation of energies of 0.05 to 15 mev. for a time sufficient to effect the desired dimerization.

5. A method of dimerizing dichloroethylene which comprises treating dichloroethylene with a basic material to wash out hydrochloric acid present and then heating the washed dichloroethylene to a temperature of from 50° C. to 200° C. under the influence of an applied ionizing radiation of energies of the order of 0.25 to 2.5 mev. absorbed to the extent of about 1 to 20 watt-hours for each gram-mole of dichloroethylene.

6. A method of dimerizing dichloroethylene which comprises treating dichloroethylene with a basic material to wash out hydrochloric acid present, and then heating the washed dichloroethylene to from 50° C. to 90° C. under the influence of an absorbed gamma-radiation of about 1 to 20 watt-hours for each gram-mole of dichloroethylene.

7. A method of dimerizing dichloroethylene which comprises treating dichloroethylene with a basic material to wash out hydrochloric acid present, and then heating the washed dichloroethylene to from 50° C. to 90° C. under the influence of an absorbed high energy electron radiation of about 1 to 20 watt-hours for each gram-mole of dichloroethylene.

8. A method of dimerizing dichloroethylene which comprises treating dichloroethylene with a basic material to wash out hydrochloric acid present, and then heating the washed dichloroethylene to from 50° C. to 90° C. under the influence tof an absorbed X-ray radiation of about 1 to 20 watt-hours for each gram-mole of dichloroethylene.

References Cited in the file of this patent
UNITED STATES PATENTS
2,961,388   Blardinelli et al. _____ Nov. 22, 1960